April 3, 1934.    J. W. CLARK ET AL    1,953,701
TWO-LINE PIPE
Filed Feb. 7, 1933

Inventors:
Joe W. Clark
John P. Nixon
By Chapin & Ferguson
Attorney.

Patented Apr. 3, 1934

1,953,701

UNITED STATES PATENT OFFICE 1,953,701

TWO-LINE PIPE

Joe W. Clark and John P. Nixon, Columbia, S. C.

Application February 7, 1933, Serial No. 655,552

2 Claims. (Cl. 285—21)

This invention relates to improvements in two-line pipes and is adapted for use in houses or other places where it may be desired to run hot and cold water through the same pipe, or where it may be desired to run two different kinds of liquid through the same pipe. The invention further relates to valves and various connections and couplings for connecting to pipes.

The invention consists of the novel construction and arrangement of the parts and combination of parts hereinafter more fully set forth in the following specification and pointed out in detail in the appended claims.

In the accompanying drawing,—

Figure 1:
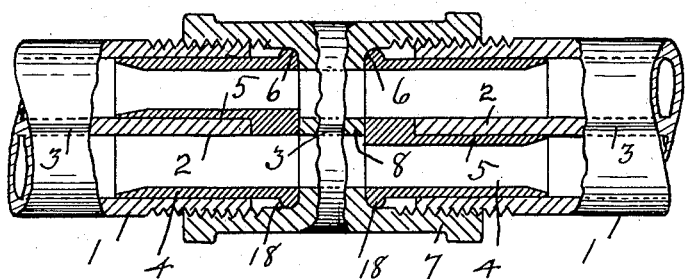
Figure 1 is an elevation of a coupling, partly broken away, showing the ends of two pipes with the nipples therein and secured in position in said coupling.
Figure 2:
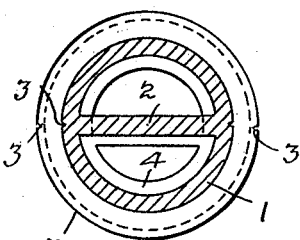
Figure 2 is an end view of Figure 1.
Figure 3:
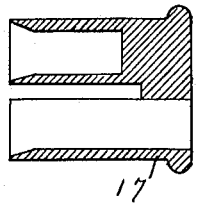
Figure 3 is a vertical longitudinal converter nipple used to cut off one line of the two line pipe in order to connect up with a single line pipe.
Figure 4:
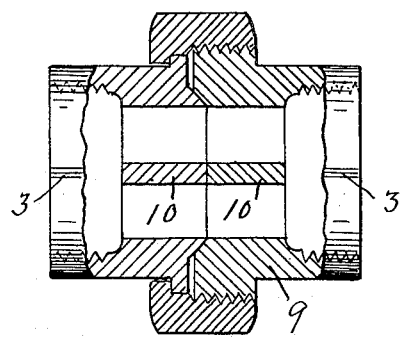
Figure 4 is a side elevation of a union, partly broken away, and which is used with the two line pipes.
Figure 5:
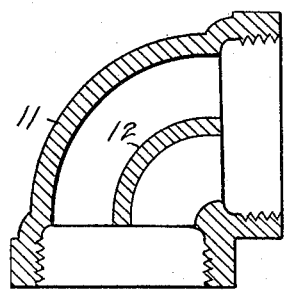
Figure 5 is a vertical longitudinal section of an elbow to be used with the two line pipes.

Referring to the accompanying drawing, forming part of this specification, and in which reference numerals designate like parts throughout the several views, 1 designates a two line pipe, which may be of any desired size, and which is provided with a central partition 2, and which is provided on the outer surface with a small groove, or other indicating means, 3 which extends the entire length of the pipe 1 on each side and in line with the partition 2 so that the partitions 2 of the pipes 1 may be brought in perfect alignment with each other, or with the partitions of the various fittings, when the pipes and fittings are secured together. In Figure 1 of the drawing we have the ends of two pipes 1 provided with nipples 4 having one end extending into the pipe 1 and provided with a slot 5 into which the end of the partition 2 projects, and the other end of the nipple 4 is provided with a flange 18 rounded to fit the rounded shoulder 6 of the coupling 7 to provide a water tight joint. The coupling 7 is also provided with a partition 8 which comes in line with the partition 2 of the pipes 1. The coupling 7 is also provided with the groove, or other indicating line, 3 to assure perfect alignment of the partitions of the pipes 1 with the partition 8 of the coupling 7. When it is desired to cut off one line of the pipe 1 in order to couple up with a single line pipe, the nipple 17 is used in the end of the pipe 1 instead of the nipple 4. The union 9 shown in Figure 4 of the drawing may be employed instead of the coupling 7. This union 9 is also provided with a central partition 10 and a groove, or other indicating line, 3 on its outer surface in line with the partition 10 to insure proper alignment of the partitions 10 with the partition 2 of the pipes 1. The elbow 11 shown in Figure 5 is also provided with a central partition 12 and an indicating line the same as the other couplings.

Figure 6:
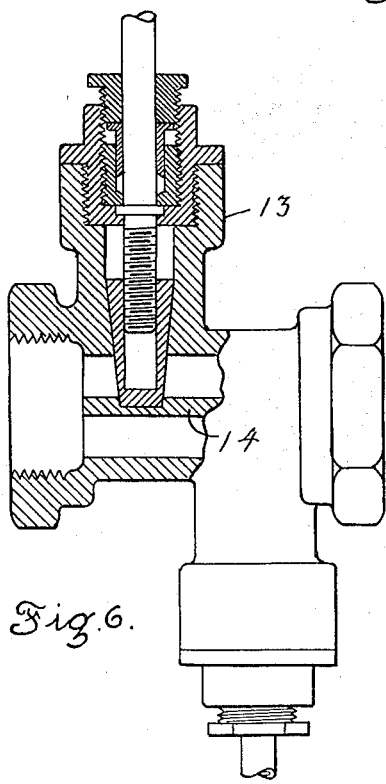
Figure 6 is a gate valve to be used with the two line pipes.
Figure 7:
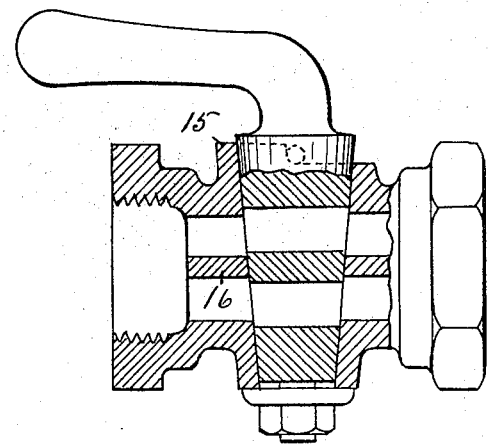
Figure 7 is a stop valve used with the two line pipes.

In Figures 6 and 7 we have shown a gate valve and stop valve, respectively, to be used with our two line pipes. The gate valve 13 is provided with a central partition 14 and the stop valve 15 is provided with a central partition 16, both of which align with the central partition 2 of the pipes 1 when secured therein.

All of the pipes, connections and valves used with our two-line pipes are provided on their outer surfaces with a groove, or other indicating means, to insure perfect alignment with the partitions of the pipes 1.

Having thus described our invention, what we claim is:

1. The combination with a pipe having a partition on the inside forming two separate chambers, and an indicating means on the outer surface of the pipe on opposite sides and in line with the partition on the inside of the pipe, a nipple having one end adapted to fit within the end of the pipe and provided with a slot into which the partition in the pipe fits and a shoulder on its opposite end, and a coupling adapted to be screwed on the ends of two pipes and into which the shouldered ends of the nipple project and having a partition in line with the partition in the pipes.

2. The combination with a pipe having a partition on the inside forming two separate chambers, and an indicating means on the outer surface of the pipe on opposite sides and in line with the partition on the inside of the pipe, a nipple having one end adapted to fit within the end of the pipe and having a partition on the inside forming two chambers one extending entirely through the nipple and the other closed at one end to cut off one line of the pipe, said nipple being provided with a slot in one end into which the partition in the pipe projects and a flange on its opposite end, and a coupling having two shoulders on its inner surface and adapted to be screwed upon the ends of two of said pipes and into which the flanged ends of the nipple project, the flanges of the nipple impinge against the said shoulders to form a water-tight joint, said coupling having a partition therein in line with the partition in the said pipes.

JOE W. CLARK.
JOHN P. NIXON.